United States Patent Office 3,848,035
Patented Nov. 12, 1974

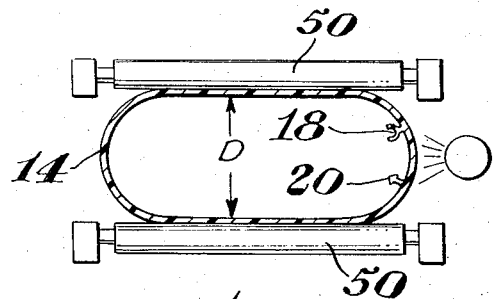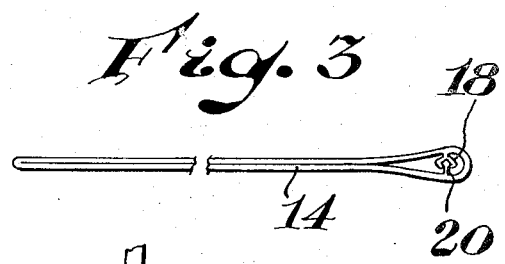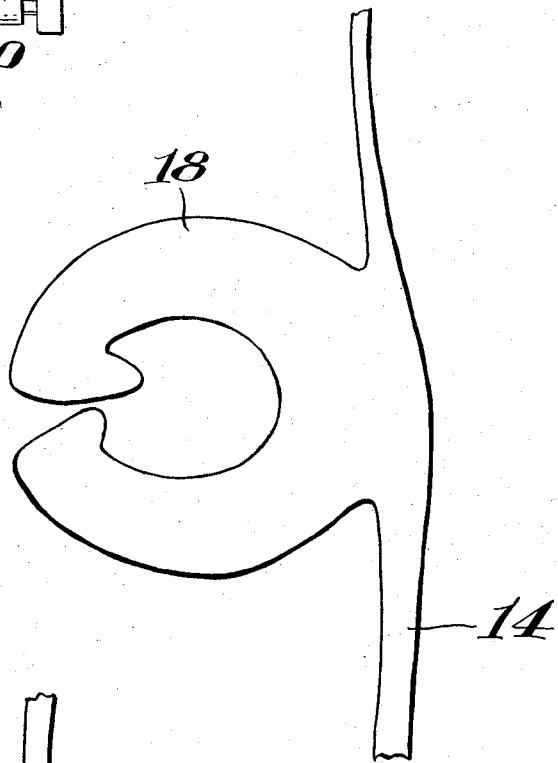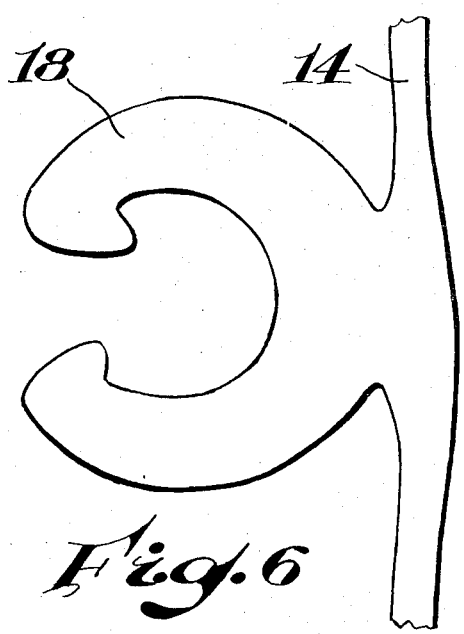

3,848,035
PROCESS OF MANUFACTURE OF FILM HAVING THICKENED PROFILES THEREIN
Raymond D. Behr, Midland, Mich., assignor to The Dow Chemical Company, Midland, Mich.
Continuation-in-part of abandoned application Ser. No. 99,782, Dec. 21, 1970. This application Jan. 3, 1972, Ser. No. 214,753
Int. Cl. B29d 7/22, 23/04
U.S. Cl. 264—40
2 Claims

ABSTRACT OF THE DISCLOSURE

The present invention resides in the discovery that by partially collapsing or flattening tubularly extruded film preferably almost immediately after it is extruded, certain critical dimensions of thickened profiles simultaneously extruded with the film can be better controlled. Properly formed profiles of this type normally take the form of a rib receivable in a groove profile to form a zipper-like closure for bags made from such film.

This application is a continuation-in-part application of my copending application Ser. No. 99,782, filed Dec. 21, 1970, now abandoned.

BACKGROUND OF THE ART

The present invention relates to the art of extruding plastic tubular film of the type having circumferentially spaced apart, thickened sections or profiles which extend continuously in the axial direction, and which are configured to interlock mechanically with each other, and thereby form a zipper-like fastener integral with the film. As a typical example of such film, one of the fasteners referred to herein as a bead or rib member, is normally arrowhead-shaped including an enlarged head portion, and a stem which attaches the head portion to the film. The opposite fastener, referred to herein as a groove, may comprise spaced apart arms which together define a gap in which the indictaed head portion is received. The outer extremities of the arms are normally made to hook inwardly to firmly lock the head portion within the gap.

Customary practice is to extrude such film as an elongated tube or film bubble supported by internal air pressure. The main portion of the film, since it is relatively thin, will be substantially cooled and solidified at a region not too far from the point of extrusion. The thicker profile areas thereof, however, even though extra cooling air is usually supplied selectively thereon, will remain molten or semi-molten for a longer period. This phenomena is usually visually detectable by observing the film frost line which in usual practice, normally settles relatively close to the extrusion die, in contrast to the frost line of the profiles which occurs much more remotely therefrom.

The problem specifically in manufacturing the above film, is that the groove tends to collapse, that is, the arms of the groove come together thereby closing or partially closing the groove and making it unusable. Also, there may be a tendency for excess thinning adjacent the base of one or more of the profiles. Normally the problem will start to become particularly critical when the manufacturing rate exceeds about 75 to 80 feet per minute.

The above profile disfigurations are herein attributed principally to hoop tension in the film, created by the internal pressure supporting the same, and such disfigurations apparently occur as the film travels between the aforenoted frost lines. That is, the discrepancy in cooling rates results in early solidification of the film, while the profiles are still partially liquid, in turn, causing disfiguration of the profiles by hoop tension up until the time the profiles become hardened or solidified.

In my copending application Ser. No. 99,782, filed Dec. 21, 1970, and now abandoned, I have disclosed that such problems, which are encountered particularly in the high speed manufacture of this film, can be minimized by lowering the air pressure surrounding the film at the region between the die head and the film frost line. By utilizing this technique I was able to maintain the film bubble with a lower differential pressure in the areas between the film frost line and profile frost line, and consequently significantly relieved the hoop tension in the film at time periods while the profiles were still molten. In any event, I found that through the above technique, I could better control the amount the groove closed, and the tendency of the film to thin down excessively in the profile areas.

This invention adds to my teachings above in that I have discovered that by applying a flattening pressure to opposite sides of the film, in the area between the aforenoted frost lines, I am able to selectively reduce the hoop tension in the areas thereof that are so flattened, and by such means better control the resultant shape of the profile areas of the film. To incorporate these latter teachings and principles in a functional process for the manufacture of profile carrying film is accordingly the primary objective of this invention.

SUMMARY OF THE INVENTION

Briefly then the present invention contemplates a process of tubularly extruding film of a type carrying longitudinally continuous profile fasteners wherein such method incorporates the step of partially collapsing the film at a region between the film frost line and the profile frost line. Such a step benefits the process by diminishing the tendency of the film to thin in the profile regions thereof, together with giving better control over certain critical dimensions of the groove profile.

BRIEF DESCRIPTION OF THE DRAWINGS

The preferred embodiment of the invention is shown in the accompanying drawing wherein wheresoever possible like reference numerals designate corresponding materials and parts throughout the several views thereof in which:

FIG. 2 is a cross sectional view of freshly extruded and partially flattened profile carrying film taken along reference line 2—2 of FIG. 1;

FIG. 3 shows film of like character to that of FIG. 2, but with the profile fasteners therein being in the occluded or interlocked position; and FIGS. 4 through 6 are greatly magnified views of a groove profile showing the response of such to the profile control step taught herein.

DESCRIPTION OF THE PREFERRED EMBODIMENT

Figure 1:
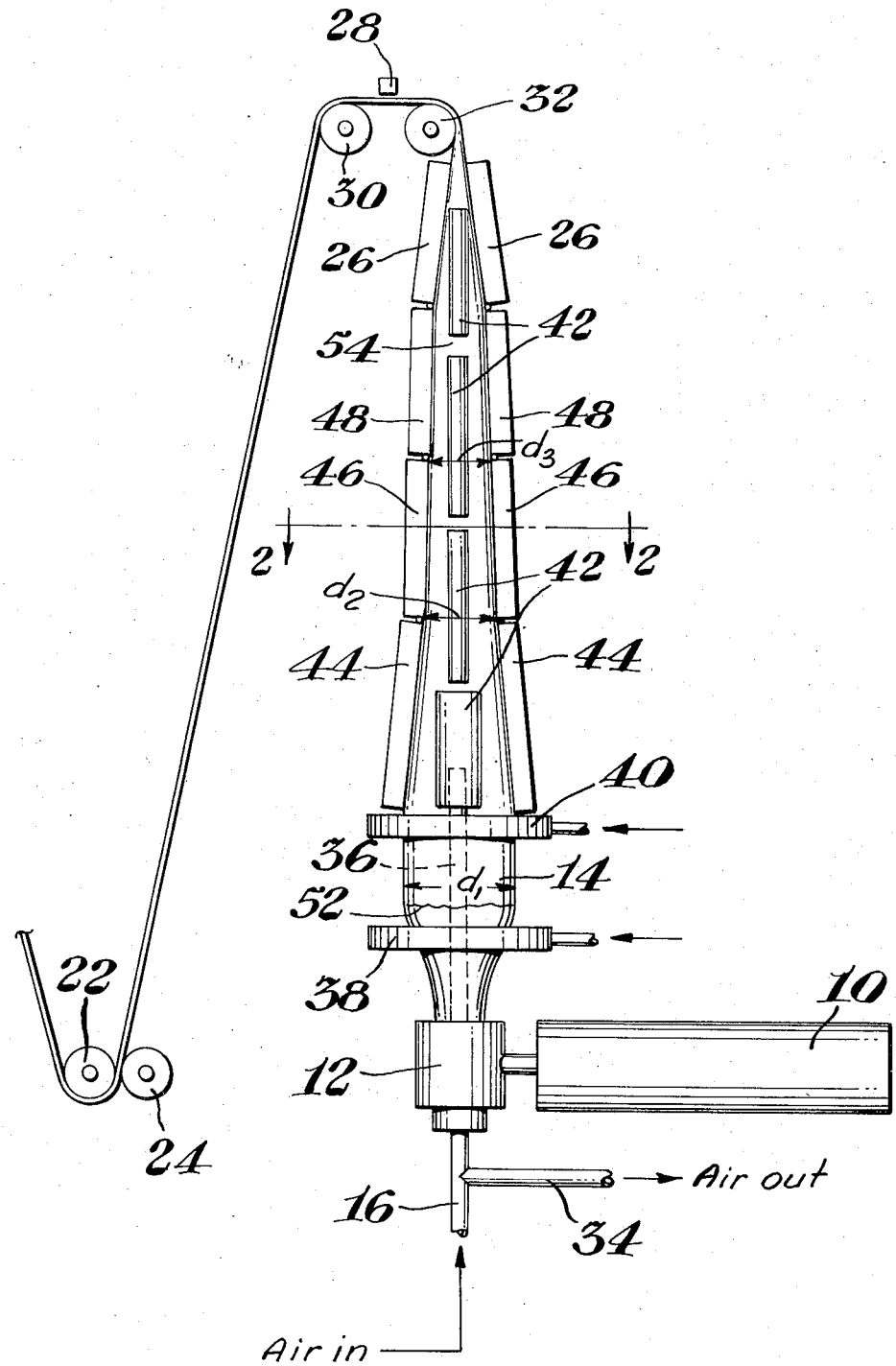
FIG. 1 is an elevational view, portions of which are generally schematic in nature, and which represents and illustrates a process and apparatus for manufacturing profile carrying film in accordance with the general teachings and principles of this invention.

Referring now more particularly to the drawings there is illustrated in FIGS. 1 and 2, a film extruding process wherein there is employed an extrusion chamber 10 which is adapted to receive plastic material customarily in pellet form, heat plastify it, and then deliver it under pressure to a tube forming die head 12 from which the plastic eventually emerges as a continuous tubular envelope or bubbler 14. The bubble is supported by air pressure supplied internally thereto through an air inlet pipe 16 connecting into the bottom of die head 12. The cross section of the film manufactured by this process is shown in FIG. 2 and comprises continuous profile fasteners, such as a groove profile 18 circumferentially spaced apart from a rib profile 20. The profile fasteners interlock as shown in FIG. 3 to provide a film which via cross sealing is made into bags integrally incorporating such file fasteners therein.

The film, after it leaves the die head, and at a point pulled forward by drive rolls 22 and 24. The drive rolls, as a preferred practice, are operated at a sufficient rate with respect to the rate of extrusion, to stretch the film in the longitudinal direction, causing it to thin down from its extruded width or gauge. Additionally, it is oftentimes the practice to stretch or distend the film circumferentially by means of the pressure supporting the bubble, and which is trapped by collapsing the film such as by use of a collapsing rack 26 placed remotely above die head 12.

The supporting pressure can be controlled automatically by means of a film measuring device 28 which is positioned between a pair of spaced apart idler rollers 30 and 32 over which the film is fed flatly after it leaves collapsing rack 26. Device 28 continually measures the lay flat width of the film, and responsive to such measurements, controls the rate air is fed thereto through inlet pipe 16, thus ultimately controlling the size of the extruded film via controlling the pressure within the bubble.

It has been the usual practice prior to this invention to refrigerate the air going through inlet pipe 16, and recycle it out through an outlet pipe 34, while maintaining the desired pressure within the film. By this technique, and by using an extended vertical pipe 36, disposed internally within the film, and which is fed by air inlet pipe 16, the incoming air, or other cooling fluid, can be continually and selectively directed onto the profiles to speed the solidification of such heavier regions of the film. Also a pair of air rings 38 and 40, located in spaced apart relationship above the die head, supply cooling air, again preferably refrigerated, continuously and circumferentially to the film almost immediately after it is extruded. Even in supplement to the above, it has been the usual practice to direct refrigerated air selectively to the profiles from the external side of the bubble, such as by means of external vertical air pipes 42 positioned above air ring 40, and which extend in alignment to near the top of the bubble.

Hingedly attached to the bottom of collapsing rack 26 are three film collapsing sections, 44 through 48, each comprised of a series of aligned rollers 50 (see FIG. 2) which "ride" in free rotation against bubble 14. The collapsing rack which may be constructed like sections 44 through 48, can be approximately 6 feet in length and was used prior to my invention. The three collapsing sections, however, have been added to the practice of this process to control thinning of the film in the areas adjacent the profiles, and also beneficially counteract the tendency of the grooves profile to collapse, and to actually control the amount of the latter so that a usable profile is manufactured.

Preferably and to take maximum advantage of this invention the lower collapsing section 44 extends to a point about as close as practically possible to the film frost line without interfering with air ring 40. The film frost line, which is noted at 52 in FIG. 1, will normally settle somewhere between the air rings 38 and 40, although it may move somewhat therefrom depending largely on the rate of manufacture, and the efficiency in cooling the film. The frost line of the profile fasteners is usually considerably higher than the film frost line, and for purposes of description, is arbitrarily denoted in the upper regions of the bubble at area 54.

In any event, compressing or flattening the film, in the area between frost lines 52 and 54, as is accomplished by collapsing sections 44 through 48, has the effect of reducing hoop tension in such area of the film. As explained in my copending application, I discovered that by controlling hoop tension in such area, that is, between the two frost lines, I could control collapse of the groove profile, together with minimizing excess thinning of the film especially in regions adjacent the profiles.

The amount of such reduction in hoop tension I believe is substantially in direct proportion to the reduction in the diameter of the film, as denoted by "D" in FIG. 2, assuming, of course, other conditions are constant. For example, a decrease in "D" of 10%, occasions I believe a decrease in hoop tension, selectively as to the area flattened by a corresponding amount of approximately 10%. By further decreasing "D" as, for example, by 20%, 30%, 40%, 50%, and so forth, hoop tension can be further progressively and significantly reduced by the amount corresponding to such reduction in the value "D."

EXAMPLES

By way of further illustrating of the invention, controlled experiments are conducted to demonstrate the response of the groove profile to the flattening effect of sections 44 through 48 at a manufacturing rate of about 100 feet per minute. Polyethylene, with small amounts of blended additives, is used as the film forming polymer.

The middle collapsing section 46 is 10 feet in length; and the like dimension of the top collapsing section 48 is 7 feet; and that of the bottom collapsing section 44 is 5 feet. The rollers 50 thereof are about 2 inches in diameter, set on an axis-to-axis spacing of about 2.4 inches in each section. The collapsing rack is 6 feet in length, and the height of the bubble is about 31 feet. The diameter of the bubble, as taken at $d_1$ in FIG. 1, is approximately 5.6 inches, and its lay-flat width is approximately $8^{13}/_{16}$ inches. The gauge of the film at regions remote from the profiles, is about 1.8 mils within a tolerance range of about 1.5 to 2.1 mils. The gauge of the profiles in the interlocked position, and including the film on each side thereof, is roughly about 50 to 70 mils. The cooling parameters are maintained substantially constant and are at a level of efficiency roughly in accordance with prior practice.

In the results shown in FIG. 4 herein, the opposed parts comprising middle section 46 are set in parallel relationship at a spacing $d_2$ and $d_3$ of about 5.5 inches, or just slightly less than the diameter of the bubble at $d_1$.

The lower section 44 is essentially open, but may be used to slightly collapse the film to avoid an abrupt change in the diameter of the film. As can be seen from the drawing, which is a rough approximation of the profile as magnified 50 times, the profile has collapsed to an extent that it is unusable, and the film adjacent one side of the profile exhibits excess thinning.

The results shown in FIG. 5 are obtained using like manufacturing parameters, except $d_3$ is adjusted to about 3.25 inches, so that the opposed parts of the middle section gradually converge upwardly, causing a corresponding gradual flattening of the film as it proceeds through the length of the middle section. The profile obtained under these conditions shows significantly less collapse, but still exhibits some slight thinning of the film in the area thereof uppermost in the drawing.

In the profile shown at FIG. 6, $d_2$ and $d_3$ are commonly set at about 3.25 inches, placing the opposed parts of the middle section in parallel relationship, but significantly closer than in the first run above. Otherwise the process is conducted without significant change. The profile in this latter instance shows even further response to the increased degree of flattening, and the extent of thinning of the film, if any, is within acceptable limits.

The above demonstrates a significant positive response and control of the ultimate configuration of the groove profile, as well as film thinning, can be achieved through the step of flattening the film as it travels between the aforesaid frost lines. Obviously the extent of such flattening, if optimum advantage is to be taken thereof, must be made responsive to the operating parameters under which the film is manufactured. To maximize the response, however, the flattening effect can be extended downwardly to near the film frost line 52, as discussed generally above. The rollers 50, or other means used to achieve the flattening step, may contact the profiles while the latter are still in a molten condition, or can be oriented so as to be in a non-contacting relationship therewith, as is shown in FIG. 2.

While certain representative embodiments and details have been shown for the purpose of illustrating the invention, it will be apparent to those skilled in the art that various changes and modifications can be made therein without departing from the spirit and scope of the invention.

What is claimed is:
1. In a method of manufacturing film, the steps of:
 (a) continuously extruding a seamless tube of film while providing pressure internally to the tube, and then collapsing the moving tube at an area remote from the point of extrusion;
 (b) integrally extruding with the tube, a first thickened profile of a general type defining a continuous gap the width of which is sensitive to hoop tension in the tube during a period in its manufacture, and at least a second thickened profile spaced circumferentially from the gap defining profile and adapted to be interlockingly receivable in said gap by means of cooperating sizing and configuration between the profiles, said profiles extending continuously in the direction of extrusion along the inner surface of the tube;
 (c) passing the moving tube between opposed, spaced apart flattening means, said flattening means being adapted to partially flatten the tube over a substantial part of the region existing between the film frost line and the frost line of said thickened profiles; and
 (d) controlling the ultimate width of said gap through means of controlling the spacing between said flattening means and thus the degree of flattening effect applied thereby to the tube.

2. The method of Claim 1 wherein said film is manufactured at a rate of at least about 75 feet per minute.

References Cited
UNITED STATES PATENTS
| | | | |
|---|---|---|---|
| 3,320,340 | 5/1967 | Luca | 264—95 |
| 3,503,112 | 3/1970 | Siegel | 264—95 |
| 3,355,531 | 11/1967 | Barnhart et al. | 264—95 |
| 3,335,208 | 8/1967 | Harris | 264—95 |

FOREIGN PATENTS
| | | | |
|---|---|---|---|
| 1,286,216 | 4/1961 | France | 264—209 |

JEFFERY R. THURLOW, Primary Examiner

U.S. Cl. X.R.

264—89, 95, 177 R, 209, 210 R, 237, 348

O-1050
(5/69)

UNITED STATES PATENT OFFICE
CERTIFICATE OF CORRECTION

Patent No. 3,848,035    Dated November 12, 1974

Inventor(s) Raymond D. Behr

It is certified that error appears in the above-identified patent and that said Letters Patent are hereby corrected as shown below:

Column 2, line 69, the word "bler" should be --ble--.

Column 3, line 6, the word "file" should be --profile--.

Column 3, line 9, at the beginning of the line, insert the words --quite remote therefrom, is grasped and continuously--.

Column 3, line 55, between the words "also" and "beneficially", insert the word --to--.

Column 3, line 56, the word "grooves" should be --groove--.

Column 4, line 2, the word "callapse" should be --collapse--.

Column 4, line 18, the word "of" (second occurrence) should be deleted.

Signed and sealed this 18th day of March 1975.

(SEAL)
Attest:

RUTH C. MASON
Attesting Officer

C. MARSHALL DANN
Commissioner of Patents
and Trademarks